S. F. DAWKINS.
SEED PAN.
APPLICATION FILED JULY 15, 1919.

1,329,266.

Patented Jan. 27, 1920.

WITNESSES
A. Spitznagel
S. W. Foster

INVENTOR
S. F. Dawkins
BY
ATTORNEYS

UNITED STATES PATENT OFFICE.

STEPHEN FAIRLY DAWKINS, OF FAYETTE, MISSISSIPPI.

SEED-PAN.

1,329,266.  Specification of Letters Patent.  Patented Jan. 27, 1920.

Application filed July 15, 1919. Serial No. 310,895.

*To all whom it may concern:*

Be it known that I, STEPHEN F. DAWKINS, a citizen of the United States, and a resident of Fayette, in the county of Jefferson and State of Mississippi, have invented a new and Improved Seed-Pan, of which the following is a full, clear, and exact description.

This invention relates to improvements in seed pans, an object of the invention being to provide an improved construction of pan adapted to be removably secured to the sickle bar of a mowing machine and which will effectually guide hay, clover, and the like, over the top of the pan and collect within the pan the seed falling therefrom.

A further object is to provide at the entrance end of the pan a series of supporting guides which hold the clover or hay in an upright position until it passes on to the top of the perforated cover of the pan, preventing the clover from entering the pan and insuring an effectual collection of seed.

A further object is to provide a pan of simple, inexpensive construction which can be attached to any ordinary mower and which will readily facilitate the collection of seed.

With these and other objects in view the invention consists in certain novel features of construction, and combinations and arrangements of parts, as will be more fully hereinafter described and pointed out in the claims.

In the accompanying drawings—

Figure 1:
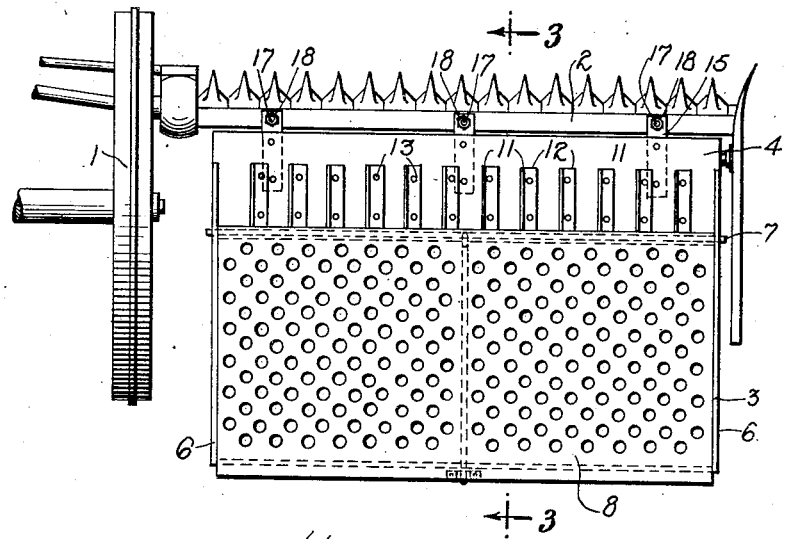
Figure 1 is a plan view of my improved seed pan showing the same attached to the sickle bar of a mowing machine.
Figure 2:
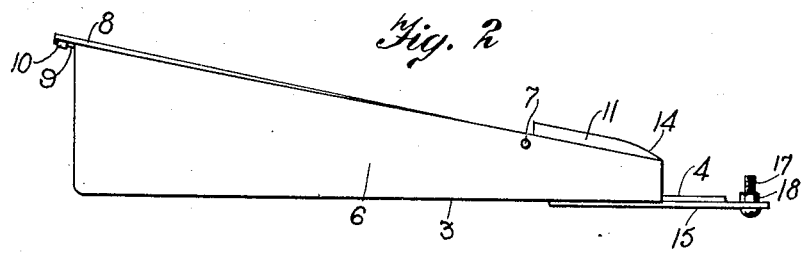
Fig. 2 is a view in end elevation of the pan detached.
Figure 3:
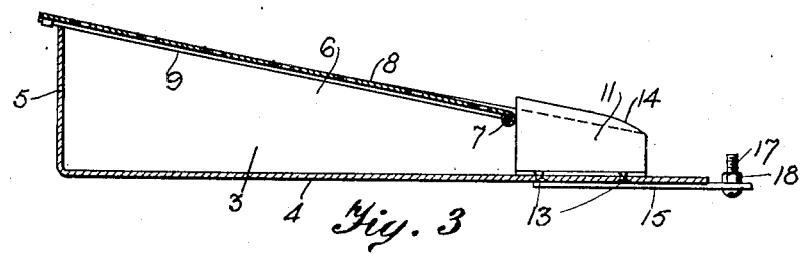
Fig. 3 is a view in section on the line 3—3 of Fig. 1, omitting all parts of the mower.

1 represents a mowing machine provided with the ordinary sickle bar 2, to which my improved seed pan 3 is secured. The pan 3 is preferably of sheet metal and comprises a relatively flat bottom 4 having an upright rear end wall 5 and side walls 6. The side walls 6 at their upper edges are inclined downwardly from their rear to their forward ends, and at a point removed from their forward ends support, adjacent their upper edges, a transverse rod 7.

A perforated cover 8 is pivotally supported at its forward edge on the rod 7, and at its rear end extends over and is supported upon the rear wall 5. A strengthening rod 9 is secured to the bottom of the perforated cover 8 centrally thereof and connects a bracket 10 on the rear portion of the perforated cover with the rod 7, strengthening the central portion of the cover to prevent sagging.

On the bottom 4 and in advance of the perforated cover 8, a series of vertically positioned parallel guides 11 is secured. These guides 11 constitute sheets of metal having base portions 12 bent at an angle therefrom, and securely riveted to the bottom 4, as shown at 13.

It will be noted that the front end of the pan 3 is open and that the guides 11 extend slightly above the forward end of the perforated cover and are rounded or tapered at their forward portions, as shown at 14. The forward ends of the guides 11 are spaced slightly from the forward edge of the bottom 4, and metal securing straps 15 are secured to the bottom 4 and project beyond the forward edge of the bottom. These straps 15 are adapted to be connected with the sickle bar 2 by means of bolts 17 and nuts 18, as clearly indicated. It will thus be noted that my improved seed pan can be secured to any ordinary sickle bar by simply providing openings therein for the reception of the bolt 17.

In operation, the cut clover, hay, etc., passes rearwardly to the guides 11 which hold the same in an upright position until it falls on to the perforated cover 8, over which it is passed rearwardly, and during such movement, the seed falling therefrom will drop through the perforated cover into the pan. When the pan is full, it is simply necessary to lift the perforated cover 8, the same being hinged or pivoted on the rod 7, when the seed can be removed.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A seed pan of the character described, comprising a receptacle, a transverse rod secured in the sides of the receptacle at a point removed from its forward edge and above its bottom, a perforated cover for the receptacle having hinged mounting on said rod, and a series of guides secured to the bottom of the receptacle positioned longitudinally of the receptacle and located in advance of the hinged rod.

2. A seed pan of the character described, comprising a receptacle, a transverse rod secured in the sides of the receptacle at a point removed from its forward edge and at a distance above its bottom, a perforated cover for the receptacle having hinged mounting on said rod, and a series of guides secured to the bottom of the receptacle positioned longitudinally of the receptacle and located in advance of the hinged rod, said guides projecting above the forward end of the perforated cover and having their upper edges inclined downwardly from their rear to their forward ends.

STEPHEN FAIRLY DAWKINS.